(No Model.) 3 Sheets—Sheet 3.
M. G. BUNNELL.
STREET SWEEPER.
No. 556,331. Patented Mar. 17, 1896.
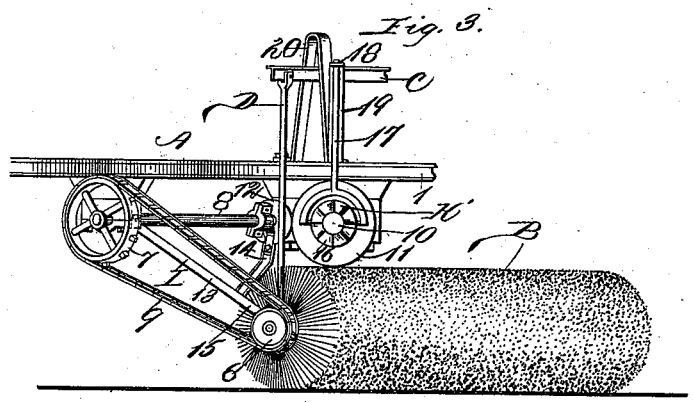
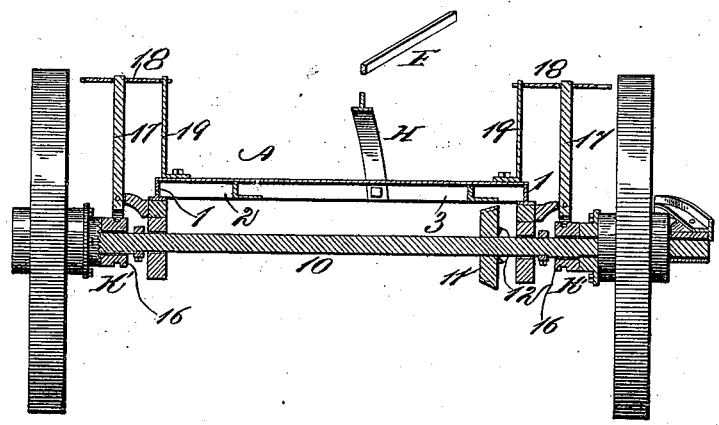
Witnesses
W. D. Middleton
Reta M. Wagner
Inventor
Norton G. Bunnell
By Chas. G. Page
Atty
ANDREW B.GRAHAM. PHOTO-LITHO. WASHINGTON,D.C.

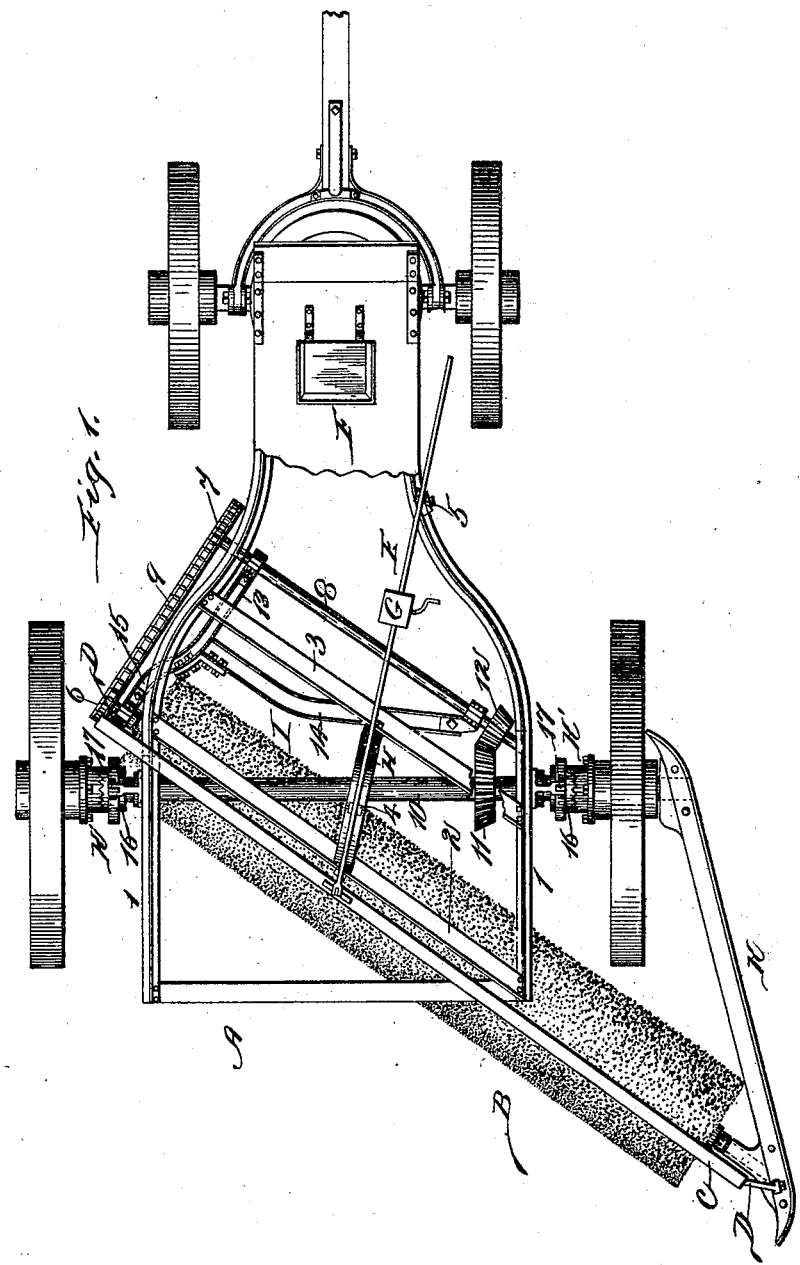

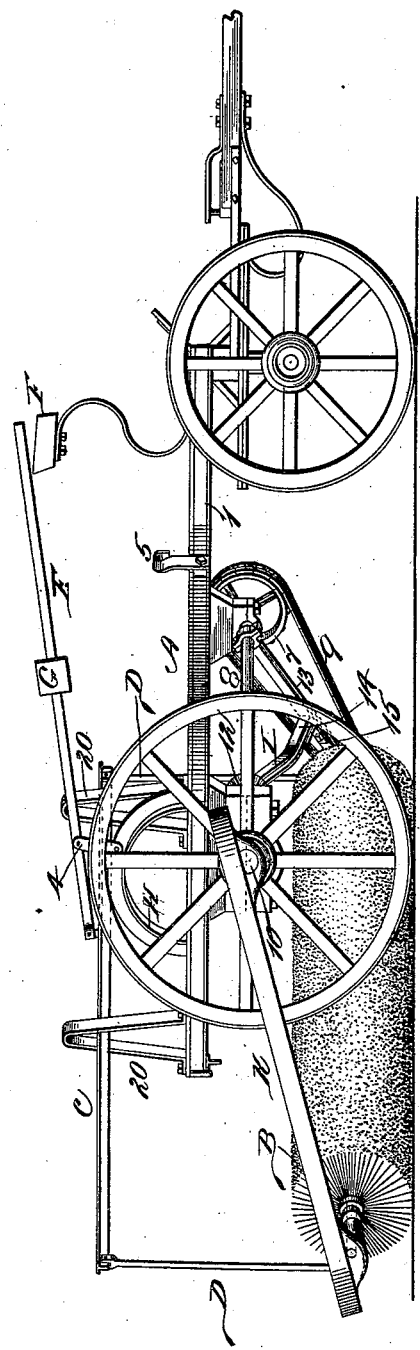

UNITED STATES PATENT OFFICE.

MORTON G. BUNNELL, OF CHICAGO, ILLINOIS, ASSIGNOR TO FREDERICK C. AUSTIN, OF SAME PLACE.

STREET-SWEEPER.

SPECIFICATION forming part of Letters Patent No. 556,331, dated March 17, 1896.

Application filed April 18, 1893. Serial No. 470,811. (No model.)

*To all whom it may concern:*

Be it known that I, MORTON G. BUNNELL, a citizen of the United States, residing at Chicago, in the county of Cook and State of Illinois, have invented a certain new and useful Improvement in Street-Sweepers, of which the following is a specification.

My invention relates to street-sweepers of the kind in which a four-wheeled body-frame is provided with a counterweighted lever and adjuncts for raising and lowering a diagonally-arranged rotary brush, and the latter arranged to be driven by a chain or belt from a short counter-shaft arranged in advance of the rear axle.

The objects of my invention are to provide a simple, comparatively light, and easy-working machine, and to provide certain novel details and arrangements of parts serving to render the machine generally efficient.

In the accompanying drawings, Figure 1 is a top plan view of a street-sweeping machine embodying my invention. Fig. 2 represents the same in side elevation. Fig. 3 shows in elevation a portion of the machine as viewed from the side opposite to that shown in Fig. 2. Fig. 4 is a transverse section taken through the rear portion of the machine on a plane passing through and coincident with the axis of the rear axle, the rear wheels being, however, shown in elevation.

The body-frame A comprises side bars 1, which are connected together by cross-bars at their forward and rear ends and bent so as to form a frame which is contracted in width at its forward portion, thereby adapting said body-frame to a short front axle, as best shown in Fig. 1.

The rotary street-sweeping brush B revolves about a horizontal axis which is arranged oblique to the line of progression of the machine, and hence is of the kind commonly termed a "diagonal brush." This brush has its forward end extended under the rear axle and has its rear end arranged to extend behind one of the rear wheels, so as to form the "windrow," as it is commonly called, at one side of the machine.

The body-frame is further strengthened and its sides held rigidly apart by a couple of diagonally-arranged braces 2 and 3 arranged over the rear axle and rigidly bolted to the sides of the body-frame. The brush is suspended from a long horizontally-arranged suspension-bar C, which is arranged to extend over the length of the brush and which is provided at its ends with hangers D, with which the bearings for the brush-journals are suitably connected. This long suspension-bar is, at a point between its ends, hinged to the rear end of a single long lever E, which extends sufficiently forward to be within reach of a driver occupying the driver's seat F at the forward end of the machine. This lever is provided with an adjustable counterweight G at a point between the counterweight and bar C. Said lever is supported upon an arch H by a pivoted fulcrum 4. The arch H is arranged over the rear axle and is supported upon the diagonal braces 2 and 3, thereby rigidly connecting said braces at points between their ends and at the same time providing a simple and strong support for the lever, which sustains the weight of the brush when the forward end of the lever is depressed to an extent to raise the brush from the ground. The body-frame is also provided with a catch 5 for temporarily holding the lever when the latter is in position to keep the brush clear of the ground.

The axle of the brush is provided at one end with a sprocket 6, which is driven from a sprocket 7 on a diagonally-arranged shaft 8 by a chain or link belt 9. The rotary shaft 8 is arranged forward of and parallel with the axis of the brush and is driven from the rear axle 10 of the machine by bevel-gears 11 and 12, respectively, upon the axle and the shaft.

The bearings for the shaft 8 are secured to the sides of the body-frame, and upon said shaft I hang a three-armed bracket I, which forms a vertically-swinging draft device for one end of the brush, the opposite end of the latter being drawn from one end of the rear axle by a vertically-swinging arm K. The bracket I is formed proximately T-shaped and is arranged with its forward-extending arm 13 and its laterally-extending arm 14 hung upon the shaft 8, while its rearwardly-extending arm 15 is provided or connected with a suitable box or bearing for one of the brush-journals. By such arrangement the diagonal shaft 8 also provides a long pivotal support for the three-armed bracket I. The rear axle can be thrown in and out of clutch with the rear wheels by ordinary clutches K'. Each sliding clutch member 16 can be shifted by a clutch-lever 17, which may engage in one or the other of a set of notches or holes in a catch-bar 18 carried by a spring-arm 19 on the body-frame. By such arrangement the levers can be adjusted and locked in position for keeping the clutch members in clutch or for holding them out of clutch, as may be desired. When the machine is backed, spring-arms 19 will yield sufficiently to allow the teeth of one member of each clutch to ride over the teeth of its companion member.

As a means for checking lateral swing on the part of the single long suspension-bar which extends over and along the length of the brush, the body-frame carries guards 20, through which said bar is arranged to extend.

What I claim as my invention is—

In a street-sweeper, the combination of the body-frame provided with diagonally-arranged braces 2 and 3, the brush B, arranged parallel with the said braces and a raising and lowering device comprising the arch H, mounted upon the said diagonal braces, the counterweighted lever extending within reach of the driver and supported upon the arch by a pivoted fulcrum 4, a catch 5 for retaining the lever in a position to keep the brush clear of the ground, the single long suspension-bar C arranged above the body-frame, and having a pivotal connection with the counterweighted lever, the hangers D, D provided at each end of the said bar, and the guards 20, 20, through which the ends of the suspension-bar extend, substantially as described.

MORTON G. BUNNELL.

Witnesses:
W. D. MIDDLETON,
RETA M. WAGNER.